Jan. 29, 1929.
C. A. PIERSON
1,700,177
OVEN FRONT
Filed Dec. 5, 1927
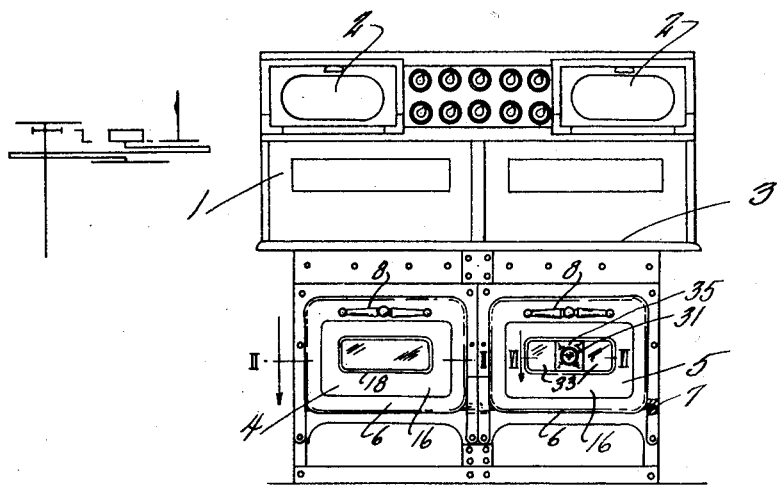
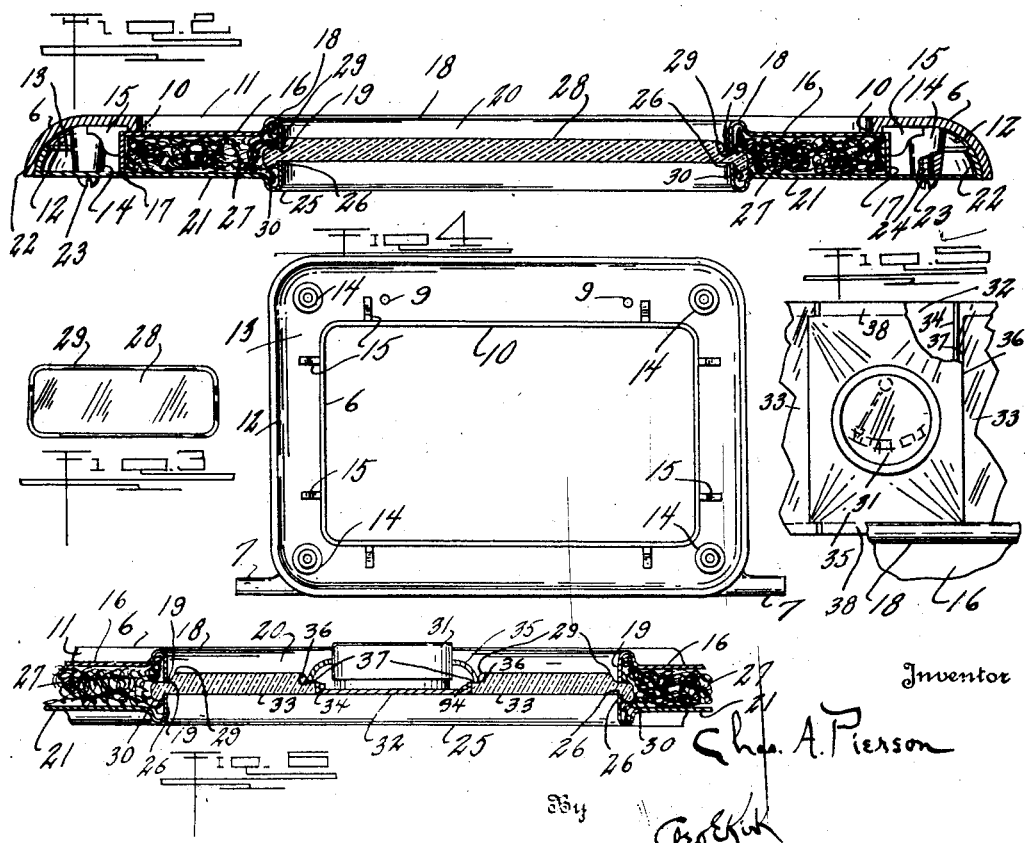
Inventor
Chas. A. Pierson
By
Attorney Patented Jan. 29, 1929.

1,700,177

UNITED STATES PATENT OFFICE.

CHARLES A. PIERSON, OF TOLEDO, OHIO, ASSIGNOR TO THE STANDARD ELECTRIC STOVE COMPANY, OF TOLEDO, OHIO, A CORPORATION OF OHIO.

OVEN FRONT.

Application filed December 5, 1927. Serial No. 237,716.

This invention relates to panel mountings.

This invention has utility when incorporated in electric stoves as transparency mounting for oven fronts.

Referring to the drawings:

Fig. 1 is a front elevation, with parts broken away, of an embodiment of the invention;

Fig. 2 is a section on an enlarged scale, on the line II—II, Fig. 1, through the door of the oven;

Fig. 3 is a small detail view of the one piece transparency or glass panel;

Fig. 4 is an interior side view of the oven door frame;

Fig. 5 is a fragmentary view of the thermometer mounting in a panel; and

Fig. 6 is a section on the line VI—VI, Fig. 1, on an enlarged scale, and through but a portion of the oven door.

Electric range 1 is shown as having warming ovens 2, range or cooking portion 3, ovens 4, 5. These ovens 4, 5, have front closures or doors for such openings, each comprising rigid frame 6 having at its lower portion trunnions 7 providing a hinge mounting for the door as swung to open position upon grasping handle 8. The handle 8 is mounted in the door frame 6 by bolts through openings 9.

The frame 6 on its outer portion is convex to terminate on its inner side in interiorly extending seat 10 as a border for ledge 11 of the door frame. From such seat 10, the frame 6 has concave wall 12 forming inner chamber 13 of this hollow frame 6. Extending into this inner chamber and integral with this cast iron rigid frame 6 are lugs 14 internally threaded for the mounting of bolts. One of these lugs 14 is disposed in each corner of the frame 6. Bounding the region of the seat 10, this frame 6 has lugs 15.

Flexible sheet metal plate 16, as the exterior face of the oven door, extends inward from the ledge 11 as the inner bounding region of the frame 6. This plate 16 nests against the seat 10 of the rigid frame and is provided with endless marginal flange 17 centering this plate 16 in the frame 6 by being engaged with the several lugs 15. This exterior plate 16, as extending inward from the door frame 6, is provided with bead 18, outwardly exteriorly projecting, terminating in interiorly projecting free edge or flange 19 at window or panel opening 20.

Opposing this plate 16 is parallel plate 21 also of flexible sheet metal. This plate 21 is marginally provided with endless flange 22 seating against the concave face 12 of the rigid frame 6. Bolts 23 through openings 24 in the flexible sheet metal plate 21 anchor this plate 21 in position to engage the flanges 17 of the opposing or companion plate 16 of this pair of plates 16, 21. This interior plate 21, as extending inwardly from the flange 17, is provided with interiorly projecting bead 25 oppositely directed to the bead 18 of the plate 16. From this bead 25 this plate 21 has free edge flange 26 extending toward the flange 19 at the window 20. The assembly of this pair of plates with the lugs 15 positioning the plate 16, and the flange 22 positioning the plate 21, insures a maintained registry of the free edges flange 19, 26, in opposing relation at the window 20 when the pair of plates are assembled in the rigid frame 6 by the bolts 23 engaging in the threaded lugs 14.

The flange 17 and the flange 22, respectively, of the plates 16, 21, provides rigidity for these plates with their mounting at the frame 6, which rigidity is effective against looseness or buckling even in the range of temperature change occurring in domestic stove operations for the preparation of food. The beads 18, 25, with the flanges 19, 26, provide an additional region of rigidity for this pair of plates, which additional region is spaced from the mounting region by the plate portions 16, 21, thereby providing, the flexible region, as expansion-contraction compensation portions.

The simultaneous assembly of the plates 16, 21, by the bolts 23 with the rigid door frame 6, occurs with the additional simultaneous anchoring, of insulation packing 27 in the chamber provided between the plates 16, 21, as a heat insulation jacket. There is additional simultaneous assembly of transparency 28 herein shown as a glass casting of heat resisting properties.

This glass 28 is provided on the exterior side with endless ledge 29 approximating abutting relation with inwardly extending free edge 19. Outwardly spaced from this ledge 29 and interiorly extending, this glass plate 28 is provided with rib 30 approximating as to its inner side, the region of the free edge flange 26. There is thus provided by these free edges 19, 26, a flexible clamping by the endless region of rigidity of the panel mounting means or plates 16, 21. This means an effective holding of the window glass 28 at all times against shifting, disturbance, looseness, as well as avoidance of binding action which might tend to fracture or rupture the glass. This end is obtained with avoidance of packing at the panel mounting even with the rigid frame at such mounting for snug assembly with the window glass.

Instead of unitary panel or glass 28, it may be desirable in mounting thermometer 31, as carried by plate 32, to provide such plate as an intermediate section in a common mounting with glass panel sections 33, cooperating with the plate 32 to complete the window closure. This plate 32 extends into the marginal region of the outer edges of the panel section 33, and as abutting the panel sections 33 has flange portions 34. Cover plate 35 as a finish about the thermometer 31 has edges 36 resting on seat 37 adjacent the ledges 29 as toward the thermometer 31. This flange plate 35, between the glass window sections 33, is provided with extensions or tongues 38 engaged by the free edge 19. It is accordingly seen that the sectional panel is as efficiently and rigidly mounted against heat leakage as the one piece panel.

What is claimed and it is desired to secure by Letters Patent is:

1. An oven door comprising a rigid frame, a pair of spaced flexible sheet metal plates extending inwardly from the frame and having registering openings for a window, said plates each having at the window an endless stiffening flange terminating in a free edge of one flange extending toward the edge of the other flange, and a transparency for the window having seat means toward the window as to one edge and away from the window as to the other edge in yieldably predetermining positioning of the transparency in the window against shifting.

2. For an electric stove oven, a rigid frame, a pair of spaced flexible sheet metal plates extending inwardly from the frame and having registering openings for a window, said plates each having at the window an outward bead and therefrom an endless stiffening flange terminating in the free edge of the flange of one plate extending toward the free edge of the flange of the other plate, and a transparency for the window having a ledge on one side of the transparency engaged by the free edge of one bead and a rib on the other side of the transparency engaged at its side opposite the ledge with the free edge of the other bead in yieldably predetermining positioning of the transparency in the window against shifting.

3. An oven door comprising a rigid frame, an exterior plate inwardly provided with a peripheral inwardly extending flange, an interior plate abutted by said exterior plate flange, said pair of plates being of sheet metal, flexible and spaced from each other by said flange, said plates as inwardly extending from the frame having registering openings for a window, there being threaded lugs carried by the frame and additional plate flange engaged lugs for positioning the exterior plate for the window opening registry, bolts through the interior plate and engaging said threaded lugs in assembling the plates in the frame, said plates each having at the window an outward bead and therefrom an endless stiffening flange terminating in the free edge of one flange extending toward the free edge of the other flange, and a transparency for the window having a ledge on the exterior side and rib on the interior side of the transparency, said ledge engaged by said exterior plate free edge and said rib on the side opposite the ledge being engaged by the interior plate free edge in yieldably predetermining positioning of the transparency in the window against shifting, said spaced plates providing a chamber therebetween, and heat insulation filler in said chamber.

In witness whereof I affix my signature.

CHARLES A. PIERSON.